(12) United States Patent
Aoki

(10) Patent No.: US 12,529,640 B2
(45) Date of Patent: Jan. 20, 2026

(54) ANALYSIS SYSTEM

(71) Applicant: SHIMADZU CORPORATION, Kyoto (JP)

(72) Inventor: Kengo Aoki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 668 days.

(21) Appl. No.: 17/781,657

(22) PCT Filed: Dec. 25, 2019

(86) PCT No.: PCT/JP2019/050911
§ 371 (c)(1),
(2) Date: Jun. 1, 2022

(87) PCT Pub. No.: WO2021/130922
PCT Pub. Date: Jul. 1, 2021

(65) Prior Publication Data
US 2023/0003631 A1    Jan. 5, 2023

(51) Int. Cl.
*G01N 1/10*   (2006.01)
*G01N 15/14*  (2024.01)
*G01N 15/1404* (2024.01)

(52) U.S. Cl.
CPC ........... *G01N 15/1404* (2013.01); *G01N 1/10* (2013.01)

(58) Field of Classification Search
CPC .............................. G01N 15/1404; G01N 1/10
See application file for complete search history.

(56) References Cited

U.S. PATENT DOCUMENTS

2014/0066280 A1  3/2014  Welz
2019/0358649 A1  11/2019 Aoki et al.

FOREIGN PATENT DOCUMENTS

| JP | 2014-518761 A | 8/2014 | |
| JP | 2016-017941 A | 2/2016 | |
| WO | WO-2018116439 A1 * | 6/2018 | ............... B03B 5/28 |

OTHER PUBLICATIONS

Office Action dated Mar. 30, 2023, for corresponding Chinese patent application CN 201980102479.0.

(Continued)

*Primary Examiner* — Jill A Warden
*Assistant Examiner* — Michael Stanley Gzybowski
(74) *Attorney, Agent, or Firm* — Muir Patent Law, PLLC

(57) ABSTRACT

A field flow fractionator (FFF device) 1 classifies particles in a liquid sample by applying a field to a liquid sample supplied from a sample injection device 5. A detector 6 detects the particles in the liquid sample classified by the FFF device 1. A bypass flow path 8 supplies the liquid sample from the sample injection device 5 to the detector 6 without via the FFF device 1. A rotary valve (flow path switching unit) 4 switches a flow path to guide the liquid sample from the sample injection device 5 to the FFF device 1 or a bypass flow path 8. The bypass flow path 8 is provided with a concentration adjusting device 9 for adjusting the concentration of the liquid sample from the sample injection device 5. In a case where a sample with the same quantity as the sample supplied to the FFF device 1 is supplied to the bypass flow path 8 at the time of analysis, the sample is diluted by the concentration adjusting device 9 such that a detection signal from the detector 6 falls within a dynamic range.

6 Claims, 6 Drawing Sheets

(56) References Cited

OTHER PUBLICATIONS

Written Opinion by the International Search Authority for PCT application No. PCT/JP2019/050911 dated Mar. 17, 2020, submitted with a machine translation.

\* cited by examiner

ANALYSIS SYSTEM

TECHNICAL FIELD

The present invention relates to an analysis system equipped with a field flow fractionator for classifying particles in a liquid sample by applying a field to the liquid sample.

BACKGROUND OF THE INVENTION

As a device for classifying fine particles contained in a liquid sample, a field flow fractionator (FFF device: Field Flow Fractionation Device) has been used. As a field flow fractionator, in addition to a centrifugal field flow fractionator, an asymmetric field flow fractionator (see, for example, Patent Document 1 listed below) or the like is known. In a field flow fractionator, by applying a field to a liquid sample in a flow path, the particles in the liquid sample are classified, and the classified particles in the liquid sample are detected by a detector.

When applying a field to a liquid sample in a flow path of a field flow fractionator, the particles in the liquid sample are likely to adhere to the flow path. Therefore, by calculating the recovery rate of the particles in the liquid sample, the validity of the analysis result is determined based on the recovery rate. The above-described recovery rate is obtained by dividing the peak area (the value of the numerator) in a case where a field is applied by the peak area (the value of the denominator) of the detection intensity in a case where a field is not applied.

As described above, in order to calculate the recovery rate of the particles in the liquid sample, it is necessary to perform the measurement in a state in which a field is not applied to the liquid sample. As a method of performing the measurement without applying a field to a liquid sample, for example, there are a first method and a second method. In the first method, a measurement is performed without applying a field to a liquid sample passing through a flow path in a field flow fractionator. In the second method, a measurement is performed by bypassing a liquid sample without making the liquid sample pass through a flow path in a field flow fractionator.

In the first method, the measurement is simply performed without applying a field to a liquid sample, and therefore, there is an advantage that a configuration change, such as, e.g., addition of piping, is not required. However, even in a case where no field is applied to a liquid sample, the particles in the liquid sample passing through the flow path in the field flow fractionator adhere to the flow path, and therefore, there is a possibility that the recovery rate cannot be accurately calculated.

On the other hand, in the above-described second method, the liquid sample does not pass through the flow path in the field flow fractionator, and therefore, the particles in the liquid sample do not adhere to the flow path. Therefore, the value of the denominator when calculating the recovery rate becomes an accurate value, and the recovery rate can be accurately calculated.

PRIOR ART DOCUMENT

Patent Document

Patent Document 1: Japanese Unexamined Patent Application Publication No. 2014-518761

SUMMARY OF THE INVENTION

Problems to be Solved by the Invention

A liquid sample passing through a flow path in a field flow fractionator is diluted in the flow path and reaches a detector. This is because the flow path in the field flow fractionator has a relatively large capacity. That is, a mobile phase is supplied to the flow path in the field flow fractionator at a constant flow rate, while the quantity of the sample injected into the mobile phase is constant. Therefore, the liquid sample is diluted in the flow path having a relatively large capacity, and then the classified particles in the liquid sample reach the detector.

In the above-described second method, the liquid sample is bypassed without passing through the flow path in the field flow fractionator and detected by the detector, and therefore, the liquid sample is hardly diluted. For this reason, the detection signal from the detector may sometimes be saturated. It is conceivable to decrease the sensitivity of the detector to prevent the saturation of the detection signal from the detector. However, in this case, when the particles in the liquid sample are classified by applying a field to the liquid sample in the flow path, the classified particles in the liquid sample may not be detected by the detector.

As described above, in the second method, the detection signal from the detector may be saturated, and therefore, the recovery rate may not be calculated within the dynamic range of the detector. In order to avoid such a problem, it is conceivable to use a detector with a wide dynamic range. There, however, arises a new problem that the production cost of the device increases.

The present invention has been made in view of the above-described circumstances. An object of the present invention is to provide an analysis system capable of preventing saturation of a detection signal from a detector without using a detector with a wide dynamic range.

Means for Solving the Problem (1) An analysis system according to the present invention is provided with a mobile phase supply section, a sample injection device, a sample injection device, a field flow fractionator, a detector, a bypass flow path, and a flow path switching unit. The mobile phase supply section is configured to supply a mobile phase. The sample injection device is configured to inject a sample into the mobile phase supplied from the mobile phase supply section to produce a liquid sample. The field flow fractionator is configured to classify the particles in the liquid sample by applying a field to the liquid sample supplied from the sample injection device. The detector is configured to detect the particles in the liquid sample classified by the field flow fractionator. The bypass flow path is configured to supply the liquid sample from the sample injection device to the detector without via the field flow fractionator. The flow path switching unit is configured to switch a flow path to guide the liquid sample from the sample injection device to the field flow fractionator or the bypass flow path. The bypass flow path is provided with a concentration adjusting device for adjusting a concentration of the liquid sample supplied from the sample injection device. In a case where a sample with the same quantity as the sample supplied to the field flow fractionator is supplied to the bypass flow path, the concentration adjusting device dilutes the sample supplied to the bypass flow path such that a detection signal from the detector falls within a dynamic range at the time of analysis.

According to such a configuration, it is possible to adjust the concentration of the liquid sample supplied to the detector via the bypass flow path by the concentration adjusting device provided in the bypass flow path. Even in a case where a sample with the same quantity as the sample supplied to the field flow fractionator is supplied to the bypass flow path at the time of analysis, the sample is diluted by the concentration adjusting device so that the detection signal from the detector falls within the dynamic range. This prevents the saturation of the detection signal from the detector without using a detector having a wide dynamic range.

(2) The above-described analysis system may be further provided with an operation unit. The operation unit is configured to calculate a recovery rate of the particles in the liquid sample based on: a detection signal from the detector in a case where the liquid sample is supplied to the field flow fractionator and a field is applied; and a detection signal from the detector in a case where a sample with the same quantity as the sample supplied to the field flow fractionator is supplied to the bypass flow path.

With such a configuration, it is possible to accurately calculate the recovery rate of the particles in the liquid sample based on the detection signal detected within the dynamic range of the detector.

(3) The concentration adjusting device may include a buffer section. The buffer section has a capacity that allows the detection signal from the detector to fall within a dynamic range at the time of analysis in a case where a sample with the same quantity as the sample supplied to the field flow fractionator is supplied to the bypass flow path at the time of analysis.

According to such a configuration, with a simple configuration in which only the buffer section is provided in the concentration adjusting device provided in the bypass flow path, it is possible to prevent the saturation of the detection signal from the detector in a case where a sample with the same quantity as the sample supplied to the field flow fractionator is supplied to the bypass flow path at the time of analysis.

(4) A capacity of the buffer section may be the same or substantially the same as a capacity of the flow path of the liquid sample in the field flow fractionator.

According to such a configuration, by diluting the sample at the buffer section having the same or substantially the same capacity of the flow path of the liquid sample in the field flow fractionator, it is possible to increase the intensity of the detection signal from the detector within the dynamic range at the time of analysis in a case where a sample with the same quantity as the sample supplied to the field flow fractionator is supplied to the bypass flow path. Therefore, it is possible to more accurately calculate the recovery rate of the particles in the liquid sample.

(5) The capacity of the buffer section may be a capacity that allows the peak intensity of the detection signal from the detector to be the same or substantially the same as that at the time of analysis in a case where a sample with the same quantity as the sample supplied to the field flow fractionator is supplied to the bypass flow path at the time of analysis.

According to such a configuration, in a case where a sample with the same quantity as the sample supplied to the field flow fractionator is supplied to the bypass flow path at the time of analysis, the peak intensity of the detection signal from the detector can be set to the same level at the time of analysis and can increase the intensity of the detection signal from the detector within the dynamic range. Therefore, it is possible to more accurately calculate the recovery rate of the particles in the liquid sample.

(6) The concentration adjusting device may be configured to dilute the liquid sample by mixing the mobile phase with the liquid sample supplied to the bypass flow path.

According to such a configuration, by mixing the mobile phase with the liquid sample supplied to the bypass flow path, it is possible to arbitrarily adjust the concentration of the liquid sample supplied to the detector via the bypass flow path according to the quantity of the mobile phase to be mixed. Thus, in a case where a sample with the same quantity as the sample supplied to the field flow fractionator is supplied to the bypass flow path at the time of analysis, it is possible to adjust the detection signal from the detector to an optimum intensity within a dynamic range.

Effects of the Invention

According to the present invention, even in a case where a liquid sample with the same concentration as the liquid sample supplied to the field flow fractionator is supplied to the bypass flow path at the time of analysis, the liquid sample is diluted by the concentration adjusting device provided in the bypass flow path such that the detection signal from the detector falls within the dynamic range. Therefore, it is possible to prevent the saturation of the detection signal from the detector without using a detector with a wide dynamic range.

EMBODIMENTS FOR CARRYING OUT THE INVENTION

1. Configuration Example of Analysis System

Figure 1:
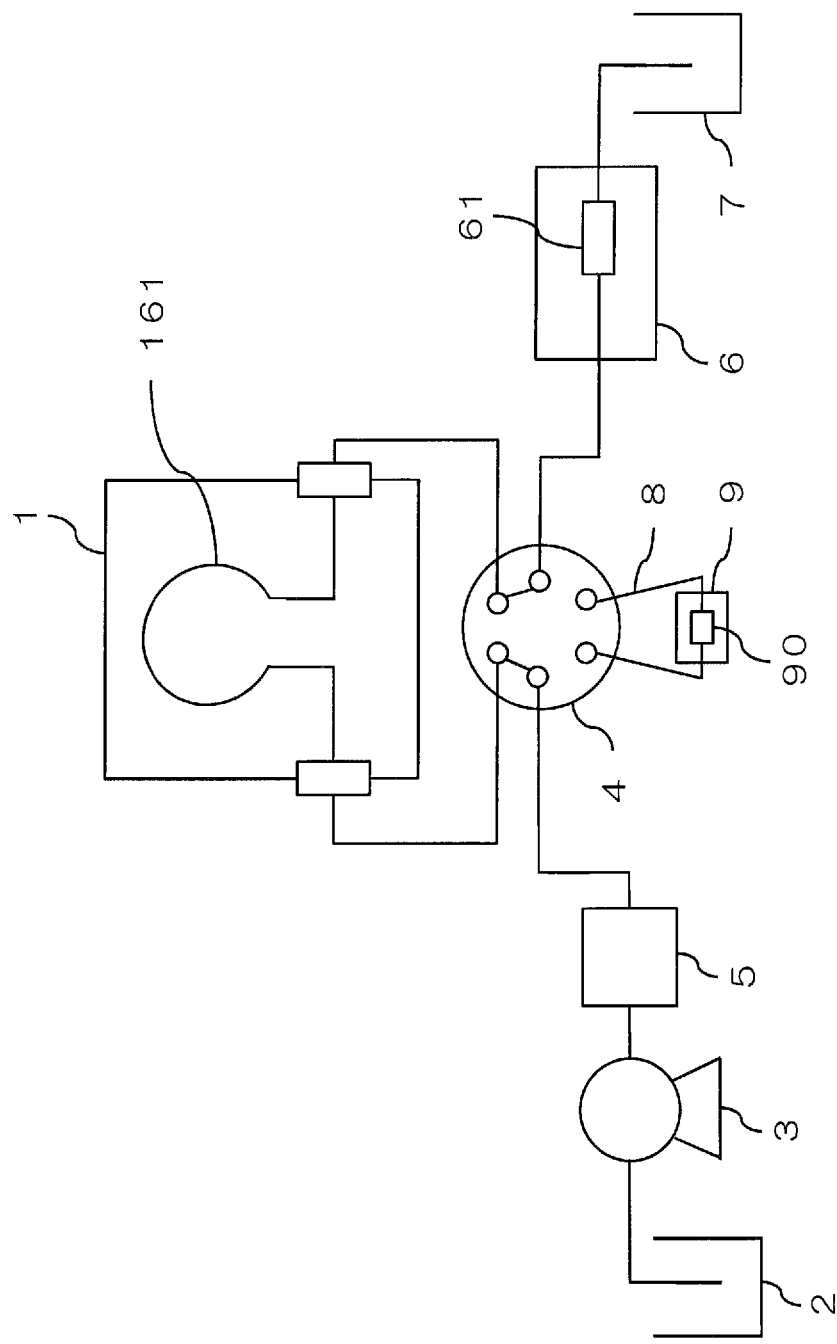
FIG. 1 is a schematic diagram showing a configuration example of an analysis system equipped with a centrifugal field flow fractionator according to one embodiment of the present invention.

FIG. 1 is a schematic diagram showing a configuration example of an analysis system equipped with a centrifugal field flow fractionator 1 according to one embodiment of the present invention. The centrifugal field flow fractionator 1 (hereinafter simply referred to as "FFF device 1") is a device for classifying particles contained in a liquid sample according to the specific gravity using a field flow fractionation method. In addition to the FFF device 1, the analysis system shown in FIG. 1 is provided with a mobile phase reservoir 2, a liquid feeding pump 3, a rotary valve 4, a sample injection device 5, a detector 6, and a waste liquid reservoir 7.

In the mobile phase reservoir 2, a mobile phase made of, for example, water or an organic solvent is stored. The mobile phase is sent out from the inside of the mobile phase reservoir 2 by the liquid feeding pump 3 and supplied to the FFF device 1 via the rotary valve 4. The mobile phase reservoir 2 and the liquid feeding pump 3 constitute a mobile phase supply section for supplying the mobile phase.

The sample injection device 5 is provided between the liquid feeding pump 3 and the rotary valve 4. The sample injection device 5 produces a liquid sample by injecting a sample into the mobile phase supplied from the liquid feeding pump 3. The generated liquid sample is sent to the downstream side by the mobile phase supplied from the liquid feeding pump 3 and is fed to the FFF device 1 via the rotary valve 4.

The liquid sample contains a large number of particles to be analyzed. To the liquid sample, a field is applied in the flow path 161 of the FFF device 1. That is, by applying centrifugal force to the liquid sample in the flow path 161, the particles in the liquid sample are classified and flow out of the FFF device 1 at different timings according to the specific gravity.

The particles sequentially flowing out of the FFF device 1 are sent to the detector 6 together with the mobile phase via the rotary valve 4. The detector 6 is provided with a cell 61. When the classified particles in the liquid sample pass through the cell 61, the particles in the cell 61 are irradiated with light, so that the scattered light from the particles is detected by the detector 6. With this, the peak of the detection intensity corresponding to the concentration of the particles in the liquid sample is detected by the detector 6. The liquid sample that has passed through the detector 6 is discharged to the waste liquid reservoir 7.

Whether or not the liquid sample is supplied to the FFF device 1 can be switched by rotating the rotary valve 4.

Figure 2:
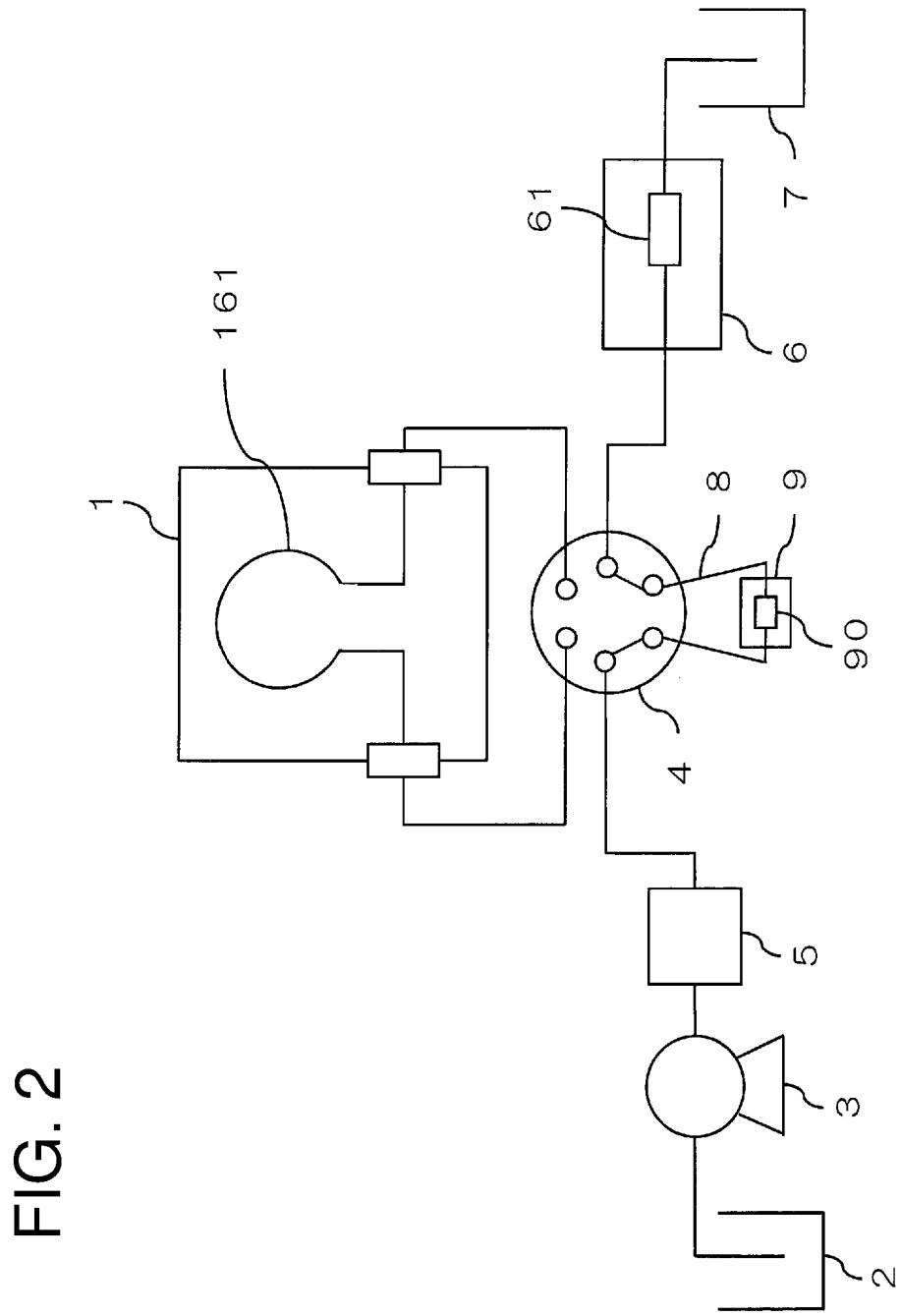
FIG. 2 is a schematic diagram of an analysis system in a state in which a rotary valve has been switched from the state shown in FIG. 1.

FIG. 2 is a schematic diagram of the analysis system in a state in which the rotary valve 4 has been switched from the state shown in FIG. 1. To the rotary valve 4, both ends of the bypass flow path 8 are connected. In the state shown in FIG. 1, although the liquid sample does not flow into the bypass flow path 8, when the rotary valve 4 is switched as shown in FIG. 2, the liquid sample passes through the bypass flow path 8 to be sent to the detector 6.

As described above, the bypass flow path 8 supplies the liquid sample from the sample injection device 5 to the detector 6 without via the FFF device 1. The rotary valve 4 constitutes a flow path switching unit for switching the flow path to guide the liquid sample from the sample injection device 5 to the FFF device 1 or the bypass flow path 8.

In this embodiment, a bypass flow path 8 is provided with a concentration adjusting device 9. The concentration adjusting device 9 is a device for adjusting the concentration of the liquid sample from the sample injection device 5. In other words, the liquid sample flowing into the bypass flow path 8 does not simply pass through the bypass flow path 8 to be supplied to the detector 6 but is adjusted in the concentration by the concentration adjusting device 9 and then supplied to the detector 6.

2. Specific Configuration of Centrifugal Field Flow Fractionator

Figure 3:
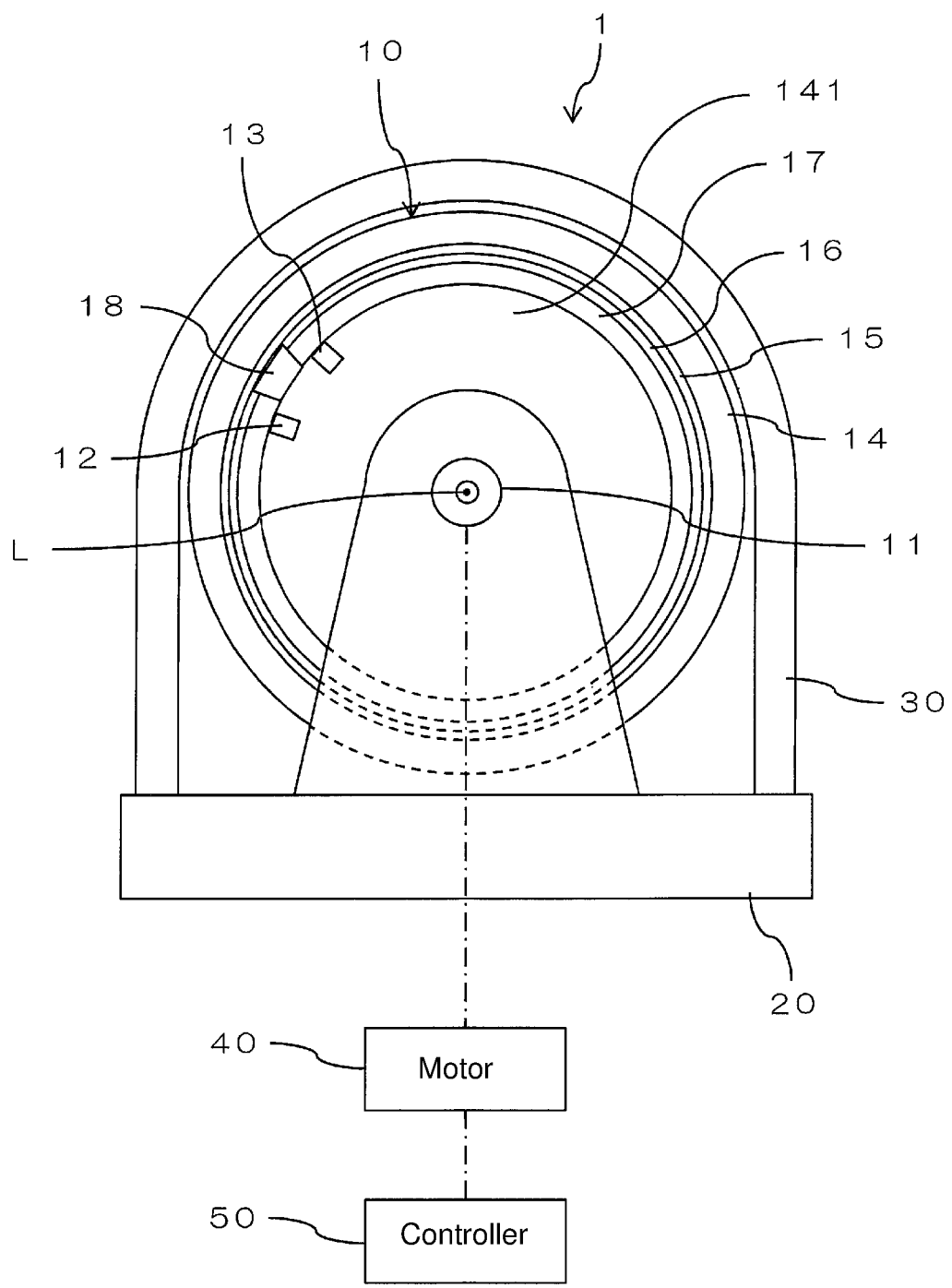
FIG. 3 is a schematic front view showing a configuration example of a centrifugal field flow fractionator.

FIG. 3 is a schematic front view of a configuration example of a centrifugal field flow fractionator 1. The centrifugal field flow fractionator 1 (FFF device 1) is configured by assembling a rotary unit 10 that rotates about a rotation shaft 11, a holding stand 20 for rotatably holding the rotation shaft 11, and a protective wall 30 for preventing the operator from coming into contact with the rotating rotary unit 10.

The rotary unit 10 is formed in, for example, a cylindrical shape and is held by the holding stand 20 such that the rotation shaft 11 attached to the center portion of the rotor extends horizontally. The protective wall 30 is, for example, a U-shaped member curved in the shape corresponding to the outer peripheral surface of the rotary unit 10 and is attached to the holding stand 20 to cover the outer peripheral surface of the rotary unit 10 in a state of facing the outer peripheral surface with a small gap therebetween.

The rotation shaft 11 is formed in a hollow shape. A liquid sample is supplied into the rotation shaft 11 from, for example, one end of the rotation shaft 11. The rotary unit 10 is provided with an inlet 12 for introducing a liquid sample before classification and an outlet 13 for discharging a liquid sample after classification. The inlet 12 and the outlet 13 communicate with the inside of the rotation shaft 11 via piping (not shown). With this, the liquid sample supplied to the inside of the rotation shaft 11 is introduced to the rotary unit 10 from the inlet 12 via the piping. After the particles in the sample liquid are classified in the rotary unit 10, the liquid sample is guided to the rotation shaft 11 from the outlet 13 via piping and is fed to the detector 6.

To the rotation shaft 11, a motor 40, which is an example of the rotation drive unit, is coupled. By rotating the rotary unit 10 by driving the motor 40, centrifugal force can be applied to the liquid sample in the rotary unit 10. The motor 40 is controlled by a controller 50 including, e.g., a CPU (Central Processing Unit). Note that the rotary unit 10 may be rotated using a rotation drive unit other than the motor 40.

The rotary unit 10 is configured as a cylindrical member as a whole by assembling, for example, a rotor 14, a spacer 15, a flow path member 16, a fixing member 17, and a wedge-shaped member 18.

The rotor 14 is an annular member with one end face closed by an end wall 141. The end wall 141 is formed in a disc shape, and the rotation shaft 11 is fixed to the central portion of the end wall. Thus, in accordance with the rotation of the rotation shaft 11, it is possible to rotate the rotor 14 about the rotation axis L coaxial with the rotation shaft 11.

In the space on the inner side of the rotor 14 (on the side of the rotation axis L), the spacer 15, the flow path member 16, the fixing member 17, and the wedge-shaped member 18 are accommodated. The spacer 15, the flow path member 16, and the fixing member 17 are each formed in an arc shape formed by curving an elongated member and are fixed in a state of being laminated in this order along the inner peripheral surface of the rotor 14. The curvature radius of each of the spacer 15, the flow path member 16, and the fixing member 17 is, for example, about 50 mm to 200 mm.

The flow path member 16 is, for example, a thin plate having a thickness of 1 mm or less and is formed in a C-shape with both end portions in the circumferential direction faced with each other via a gap therebetween. The inner side of the flow path member 16 forms a flow path 161 (see FIGS. 1 and 2) extending in the circumferential direction.

At one end of the flow path member 16 in the circumferential direction, the inlet 12 is connected. On the other hand, at the other end of the flow path member 16 in the circumferential direction, the outlet 13 is connected. As a result, the liquid sample flowed into the flow path 161 from the inlet 12 flows through the flow path 161 in the circumferential direction from one end to the other end and flows out of the outlet 13.

When classifying the particles in the liquid sample, first, the rotary unit 10 is rotated by the motor 40, and the number of revolutions of the rotary unit 10 gradually increases. When the number of revolutions of the rotary unit 10 reaches a constant value (e.g., 5,000 rpm), the liquid sample is introduced from the inlet 12 to the inside of the flow path 161 with the number of revolutions maintained.

After the mobile phase is introduced to the inside of the flow path 161 together with the liquid sample for a certain period of time, the supply of the mobile phase is stopped by switching the rotary valve 4, and the rotary unit 10 is rotated with the supply of the mobile phase stopped. Thus, the particles contained in the liquid sample in the flow path 161 are centrifuged and sedimented. Thereafter, the mobile phase is resumed to be supplied by switching the rotary valve 4. After a certain period of time, the number of revolutions of the rotary unit 10 gradually decreases.

With this, in the order from the particles having a smaller specific gravity in the liquid sample, the particles are fed toward the downstream side in accordance with the flow of the mobile phase in the flow path 161 to be sequentially flowed out of the outlet 13. In this manner, the particles in the liquid sample in the flow path 161 are classified by the centrifugal force and flow out of the outlet 13 to be fed to the detector 6 at different timings according to the specific gravity.

The fixing member 17 is a member having a thickness larger than that of the flow path member 16 and is formed to have a thickness of, for example, about 10 mm. The fixing member 17 is formed, similar to the flow path member 16, in a C-shape with both end portions in the circumferential direction faced to each other with a gap therebetween. The circumferential length of the fixing member 17 approximately matches the circumferential length of the flow path member 16. The fixing member 17 is provided along the inner peripheral surface of the flow path member 16 on the inner side of the flow path member 16 (on the side of the rotation axis L).

The flow path 161 in the flow path member 16 is set at a different height depending on the type of the mobile phase, the condition of the analysis, and the like. Therefore, the flow path member 16 is formed to have a different thickness depending on the height of the flow path 161, so that an optimum flow path member 16 is selected among a plurality of types of flow path members 16 and is attached to the fixing member 17.

The fixing member 17 attached to the flow path member 16 as described above is inserted into the space on the inner side of the rotor 14 and is fixed along the inner peripheral surface of the rotor 14 so as to sandwich the flow path member 16 between the fixing member and the rotor 14. At this time, a wedge-shaped member 18 is attached between both ends of the C-shaped fixing member 17 to thereby apply a force in the direction of expanding the gap between both the ends.

With this, the C-shaped fixing member 17 is strongly pressed against the inner peripheral surface side of the rotor 14, so that the flow path member 16 is pressed against the rotor 14 to be fixed thereto. When classifying the particles in the liquid sample, the rotor 14 is rotated at high speed, resulting in high pressure (e.g., about 1 MPa) in the flow path 161, which increases the pressure difference between the inside of the flow path 161 and the outside thereof. However, since the flow path member 16 is sandwiched between the fixing member 17 and the rotor 14, the deformation of the flow path member 16 can be prevented.

In this embodiment, the spacer 15 is sandwiched between the flow path member 16 and the rotor 14. The material of the spacer 15 is not particularly limited but is made of resin or metal, such as, e.g., PET (Polyethylene Terephthalate).

The spacer 15 is a thin plate having a thickness of, e.g., 1 mm or less and is selected from a spacer having a thickness depending on the thickness of the flow path member 16. That is, a spacer 15 having an optimum thickness is selected so that the total value of the thickness of the spacer 15 and the thickness of the flow path member 16 become substantially constant. Further, the spacer 15 has the function of preventing damage to the inner peripheral surface of the rotor 14. Note that the spacer 15 may be omitted.

3. Calculation of Recovery Rate

In this embodiment, in order to determine the validity of the analysis result, the recovery rate of the particles in the liquid sample is calculated based on the detection signal from the detector 6. The controller 50 is configured to accept the detection signal from the detector 6, and the controller 50 functions as an operation unit for calculating the recovery rate based on the detection signal from the detector 6.

The recovery rate is calculated based on: the detection signal from the detector 6 in a case where a liquid sample is supplied to the FFF device 1 and centrifugal force is applied; and the detection signal from the detector 6 in a case where a liquid sample is supplied to the bypass flow path 8. In a case where the liquid sample is supplied to the bypass flow path 8, a sample with the same quantity as the liquid sample supplied to the FFF device 1 is injected from the sample injection device 5. That is, the recovery rate of the particles in the liquid sample is calculated based on: the detection signal from the detector 6 in a case where the liquid sample is supplied to the FFF device 1 and a field is applied; and the detection signal from the detector 6 in a case where a sample with the same quantity as the sample supplied to the FFF device 1 is supplied to the bypass flow path 8.

Specifically, an operation of dividing a peak area A (the value of the numerator) of the detection intensity in the detector 6 in a case where the liquid sample is supplied to the FFF device 1 and centrifugal force is applied by a peak area B (the value of the denominator) of the detection intensity in the detector 6 in a case where a liquid sample is supplied to the bypass flow path 8. It can be determined that the larger the value obtained in this manner, the higher the recovery rate value, and the smaller the value, the lower the recovery rate value.

4. Specific Examples of Concentration Adjusting Device

As shown in FIGS. 1 and 2, the concentration adjusting device 9 includes a buffer section 90 for increasing the capacity of the bypass flow path 8. The buffer section 90 may be one increased in the capacity by a space having a larger cross-sectional area than that of the bypass flow path 8, or may be one increased in the capacity by extending the length of the bypass flow path 8.

The capacity of the buffer section 90 is set such that the detection signal from the detector 6 falls within a dynamic range in a case where a sample with the same quantity as the sample supplied to the FFF device 1 is supplied to the bypass flow path 8 at the time of analysis. The above-described dynamic range means a range (a range in which the detection signal is not saturated) capable of being detected by the detector 6. The larger the capacity of the buffer section 90, the more the sample is diluted by the mobile phase supplied at a constant flow rate, and therefore, the detection signal from the detector 6 is likely to fall within the dynamic range.

As described above, in this embodiment, in a case where a sample with the same quantity as the sample supplied to the FFF device 1 is supplied to the bypass flow path 8 at the time of analysis, the sample is diluted by the concentration adjusting device 9 such that the detection signal from the detector 6 falls within the dynamic range. That is, it is possible to adjust the concentration of the liquid sample supplied to the detector 6 via the bypass flow path 8 by the concentration adjusting device 9 provided in the bypass flow path 8.

With this, even in a case where a sample with the same quantity as the sample supplied to the FFF device 1 is supplied to the bypass flow path 8 at the time of analysis, it is possible to prevent saturation of the detection signal from the detector 6 without using a detector with a wide dynamic range. The recovery rate of the particles in the liquid sample can be accurately calculated based on the detection signal detected within the dynamic range of the detector 6.

In particular, in this embodiment, with a simple configuration in which the buffer section 90 is provided in the concentration adjusting device 9 provided in the bypass flow path 8, in a case where a sample with the same quantity as the sample supplied to the FFF device 1 is supplied to the bypass flow path 8 at the time of analysis, it is possible to prevent saturation of the detection signal from the detector 6.

The capacity of the buffer section 90 may be the same level as the capacity of the flow path 161 of the liquid sample in the FFF device 1. In this case, by diluting the sample at the buffer section 90, which has a capacity comparable to the capacity of the flow path 161 of the liquid sample in the FFF device 1, in a case where a sample with the same quantity as the sample supplied to the FFF device 1 is supplied to the bypass flow path 8 at the time of analysis, the detection signal from the detector 6 can be made high in intensity within the dynamic range. Therefore, it is possible to more accurately calculate the recovery rate of the particles in the liquid sample. Note that the capacity of the buffer section 90 is not limited to the same level as the capacity of the flow path 161 of the liquid sample in the FFF device 1, and may be a capacity equal to or larger than a certain quantity that is smaller than the capacity of the flow path 161, such as, e.g., half or more of the capacity of the flow path 161.

Further, the capacity of the buffer section 90 may be a capacity in which the peak intensity (peak height) of the detection signal from the detector 6 is the same level as that at the time of analysis in a case where a sample with the same quantity as the sample supplied to the FFF device 1 is supplied to the bypass flow path 8 at the time of analysis. Also, in this case, since the detection signal from the detector 6 can be made high in intensity within the dynamic range, the recovery rate of the particles in the liquid sample can be calculated more accurately.

5. Other Examples of Concentration Adjusting Device

Figure 4:
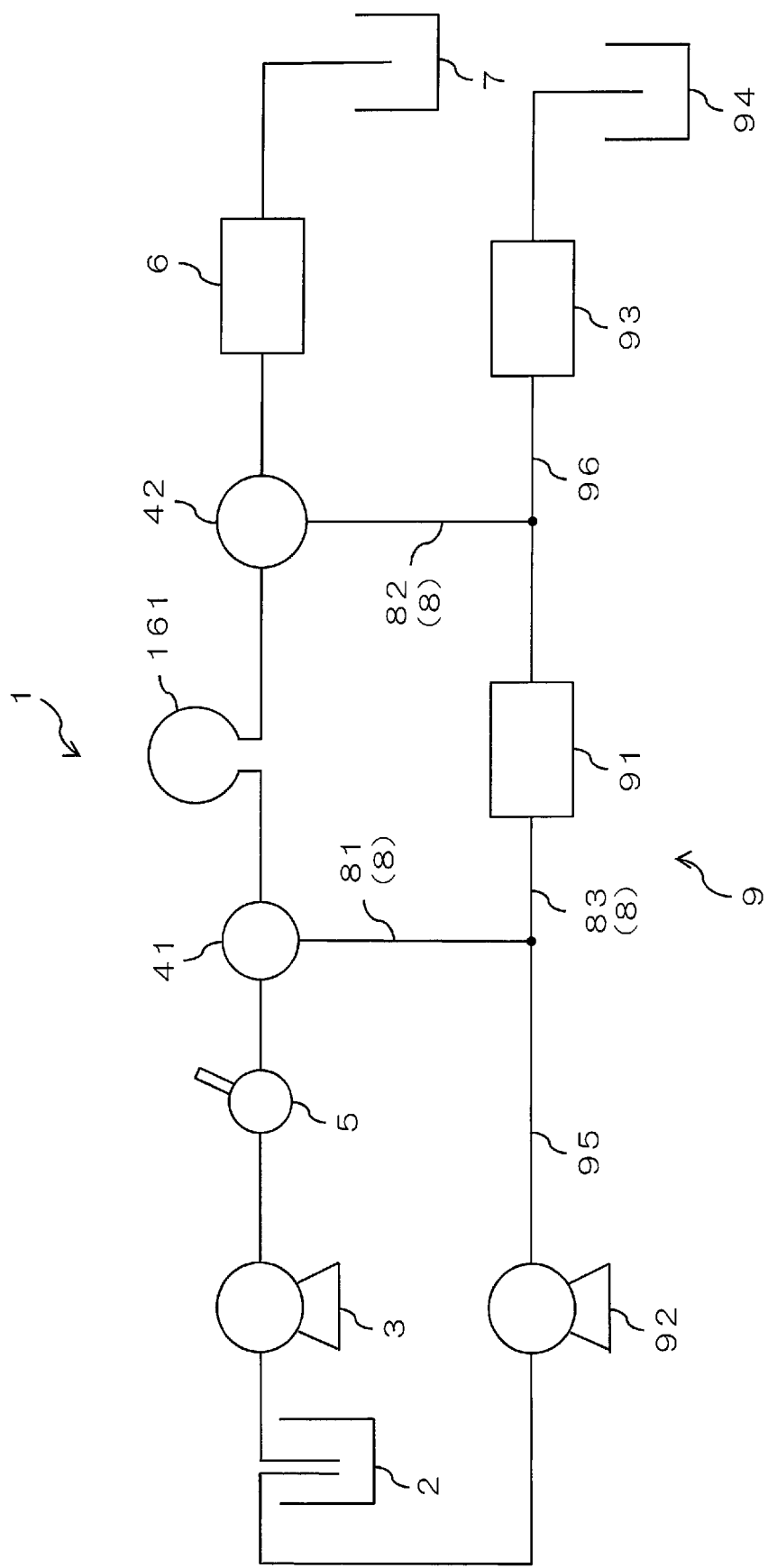
FIG. 4 is a schematic diagram showing another example of a concentration adjusting device.

FIG. 4 is a schematic diagram showing another embodiment of a concentration adjusting device 9. In this embodiment, rather than a configuration in which the concentration adjusting device 9 is provided with the buffer section 90, it is configured such that a mobile phase is mixed with a liquid sample supplied to the bypass flow path 8 to dilute the liquid sample. Configurations other than the concentration adjusting device 9 are the same as those shown in FIGS. 1 and 2, and therefore, the same reference numeral is assigned to the same component, and the detailed descriptions thereof will be omitted.

The concentration adjusting device 9 in this example includes a mixer 91, a liquid feeding pump 92, a flow rate adjustment unit 93, and a waste liquid reservoir 94. A first valve 41 is provided between the sample injection device 5 and the FFF device 1, and a second valve 42 is provided between the FFF device 1 and the detector 6. The first valve 41 and the second valve 42 constitute a flow path switching unit for switching the flow path to direct the liquid sample from the sample injection device 5 to the FFF device 1 or the bypass flow path 8.

The bypass flow path 8 includes a first branch flow path 81 connected to the first valve 41, a second branch flow path 82 connected to the second valve 42, and a connection flow path 83 for connecting the first branch flow path 81 and the second branch flow path 82. An inlet flow path 95 communicating with the mobile phase reservoir 2 is connected to the connecting portion between the first branch flow path 81 and the connection flow path 83. An outlet flow path 96 communicating with the waste liquid reservoir 94 is connected to the connecting portion between the second branch flow path 82 and the connection flow path 83.

The liquid feeding pump 92 is provided in the inlet flow path 95. By driving the liquid feeding pump 92, the mobile phase in the mobile phase reservoir 2 flows into the bypass flow path 8 via the inlet flow path 95. The mobile phase flowing into the bypass flow path 8 from the inlet flow path 95 is introduced to the mixer 91 provided in the connection flow path 83 together with the liquid sample flowing to the bypass flow path 8 via the first valve 41. Thus, the mobile phase is mixed with the liquid sample to be diluted in the mixer 91, and the diluted liquid sample is fed to the detector 6 via the second valve 42.

The flow rate of the liquid sample from the mixer 91 to the detector 6 is adjusted by the flow rate adjustment unit 93 provided in the outlet flow path 96. The flow rate adjustment unit 93 is configured by, for example, a mass flow controller (MFC) and controls the flow rate of the liquid sample from the mixer 91 to the detector 6 by adjusting the flow rate of the liquid sample discharged to the waste liquid reservoir 94 via the outlet flow path 96. Note that the flow rate adjustment unit 93 is not limited to the one constituted by an MFC provided in the outlet flow path 96 but may be constituted by other members, such as, e.g., a resistor tube, provided in the second branch flow path 82.

In this example, by mixing the mobile phase with the liquid sample supplied to the bypass flow path 8 by the mixer 91, the concentration of the liquid sample supplied to the detector 6 via the bypass flow path 8 can be arbitrarily adjusted depending on the quantity of the mobile phase to be mixed. Thus, in a case where a sample with the same quantity as the sample supplied to the FFF device 1 is supplied to the bypass flow path 8 at the time of analysis, the detection signal from the detector 6 can be adjusted to an optimum intensity within the dynamic range.

6. Other Embodiments of Analysis System

Figure 5:
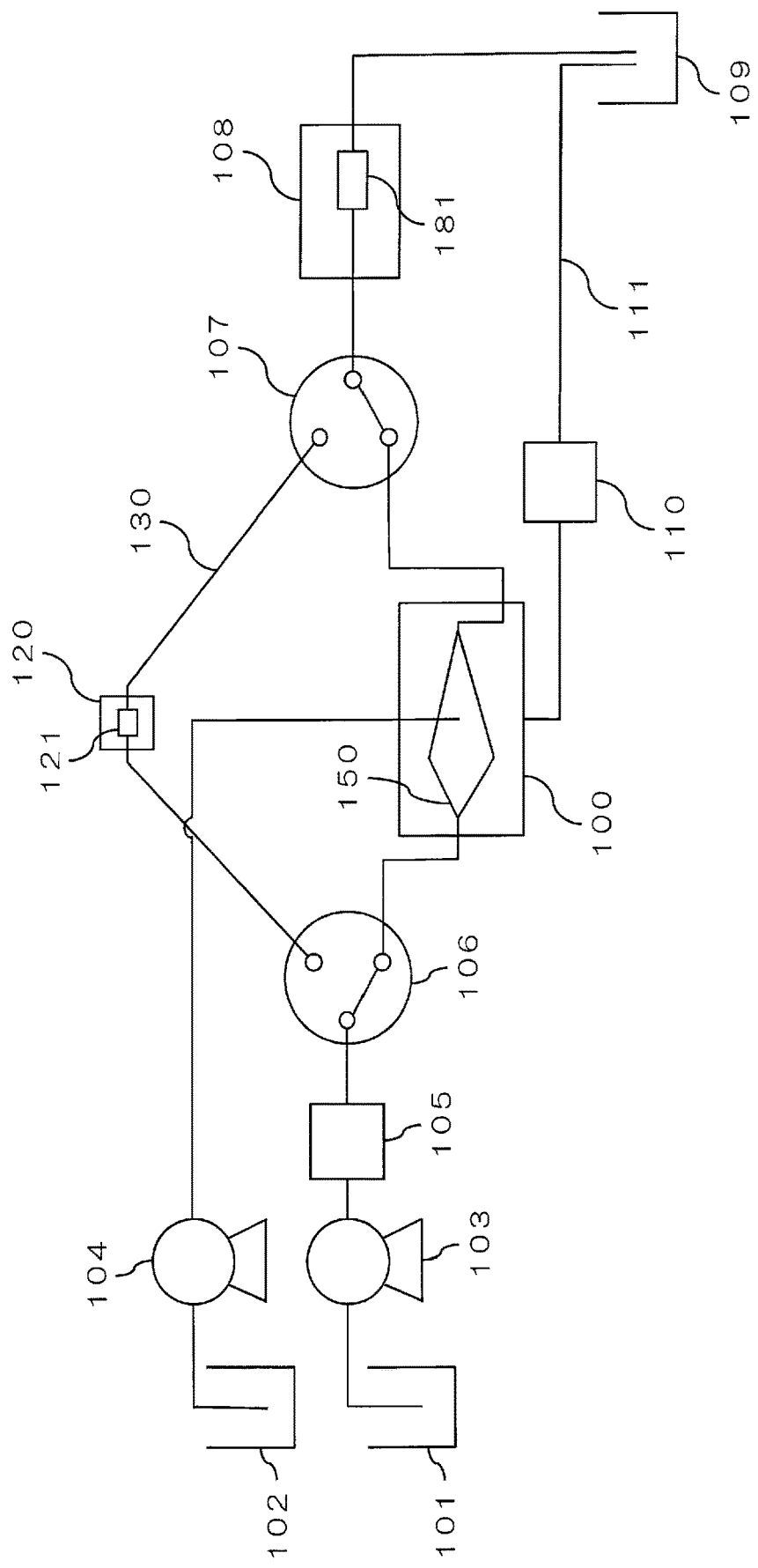
FIG. 5 is a schematic diagram showing a configuration example of an analysis system according to another embodiment.

FIG. 5 is a schematic diagram showing a configuration example of an analysis system according to another embodiment. In this embodiment, the field flow fractionator is not configured by a centrifugal field flow fractionator but configured by an asymmetric field flow fractionator (hereinafter simply referred to as "FFF device 100").

The FFF device 100 is provided with a separation cell 150. The separation cell 150 is a hollow member, and the particles in the liquid sample are classified in the process of flowing the liquid sample therein. More specifically, it is configured such that the particles in the liquid sample are classified by applying a flow (cross-flow) in a direction perpendicular to the flow direction to the liquid sample flowing in the separation cell 150 as a field.

In the analysis system shown in FIG. 5, in addition to the FFF device 100, the analysis system is provided with a first mobile phase reservoir 101, a second mobile phase reservoir 102, a first liquid feeding pump 103, a second liquid feeding pump 104, a sample injection device 105, a first valve 106, a second valve 107, a detector 108, a waste liquid reservoir 109, and a flow rate adjustment unit 110.

In the first mobile phase reservoir 101 and the second mobile phase reservoir 102, a mobile phase made of, for example, water or an organic solvent is stored. The mobile phase in the first mobile phase reservoir 101 is sent out by the first liquid feeding pump 103 and supplied to the FFF device 100 via the first valve 106. On the other hand, the mobile phase in the second mobile phase reservoir 102 is sent out by the second liquid feeding pump 104 and supplied to the FFF device 100. Note that it is not limited to the configuration in which the mobile phase is separately stored in the first mobile phase reservoir 101 and the second mobile phase reservoir 102, but it may be configured such that the mobile phase is stored in a single mobile phase reservoir.

The sample injection device 105 is provided between the first liquid feeding pump 103 and the first valve 106. The sample injection device 105 generates a liquid sample by injecting a sample into the mobile phase supplied from the first liquid feeding pump 103. The generated liquid sample is sent to the downstream side by the mobile phase supplied from the first liquid feeding pump 103 and is supplied to one end of the separation cell 150 of the FFF device 100 via the first valve 106. With this, the liquid sample flows from one end portion of the separation cell 150 toward the lower end portion thereof.

The mobile phase supplied from the second liquid feeding pump 104 is supplied to the center of the separation cell 150 of the FFF device 100. The particles in the liquid sample flowing to one end of the separation cell 150 are collected on the upstream side in the separation cell 150 by the mobile phase (focus fluid) flowing to the center of the separation cell 150, then flow to the other end of the separation cell 150 while being classified by the cross-flow, and flow out of the FFF device 100 at different timings depending on the specific gravity.

The particles sequentially flowing out of the FFF device 100 are sent to the detector 108 together with the mobile phase via the second valve 107. The detector 108 is provided with a cell 181. When the particles in the classified liquid sample pass through the cell 181, the particles in the cell 181 are irradiated with light, and the scattered light from the particles is detected by the detector 108. Thus, the peak of the detection intensity corresponding to the concentration of the particles in the liquid sample is detected by the detector 108. The liquid sample that has passed through the detector 108 is discharged to the waste liquid reservoir 109.

The cross-flow (field) in the separation cell 150 of the FFF device 100 is adjusted by the flow rate adjustment unit 110. The flow rate adjustment unit 110 is provided in the middle of the piping 111 communicating with the waste liquid reservoir 109 from the central portion of the separation cell 150. The flow rate adjustment unit 110 can be used to adjust the cross-flow by adjusting the flow rate of the waste fluid from the center of separation cell 150.

Whether or not the liquid sample is supplied to the FFF device 100 can be switched by operating the first valve 106 and the second valve 107.

Figure 6:
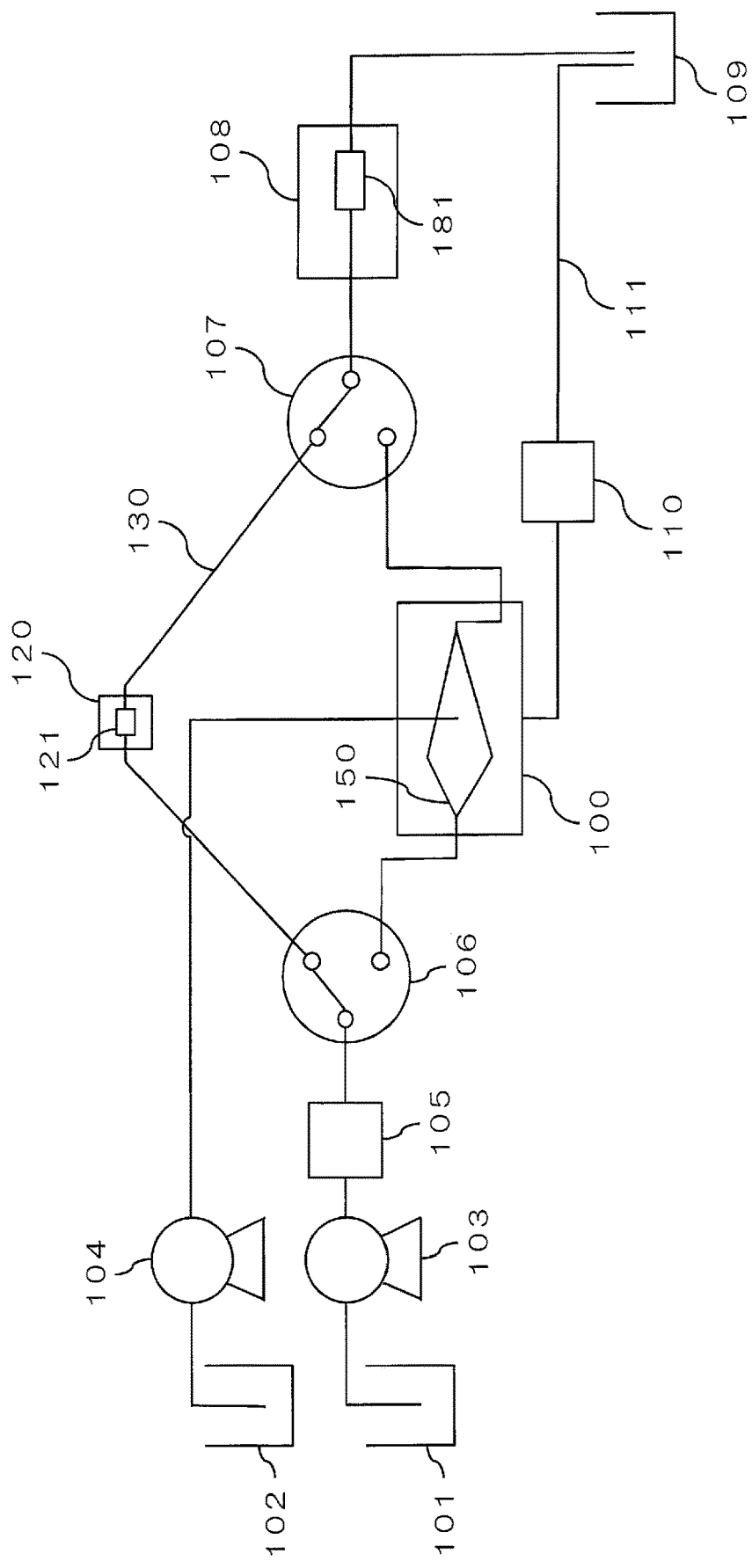
FIG. 6 is a schematic diagram of the analysis system in a state in which a first valve and a second valve have been switched from the state shown in FIG. 5.

FIG. 6 is a schematic diagram of the analysis system in a state in which the first valve 106 and the second valve 107 have been switched from the state of FIG. 5. One end of the bypass flow path 130 is connected to the first valve 106, and the other end of the bypass flow path 130 is connected to the second valve 107. In the state shown in FIG. 5, no liquid sample flows into the bypass flow path 130, but when the first valve 106 and the second valve 107 are switched as shown in FIG. 6, the liquid sample passes through the bypass flow path 130 and is sent to the detector 108.

As described above, the bypass flow path 130 supplies the liquid sample from the sample injection device 105 to the detector 108 without via the FFF device 100. The first valve 106 and the second valve 107 constitute a flow path switching unit for switching the flow path so as to direct the liquid sample from the sample injection device 105 to the FFF device 100 or the bypass flow path 130.

In this embodiment, a concentration adjusting device 120 is provided in the bypass flow path 130. The concentration adjusting device 120 is a device for adjusting the concentration of the liquid sample from the sample injection device 105. That is, the liquid sample flowing into the bypass flow path 130 is not simply passed through the bypass flow path 130 and supplied to the detector 108 but is supplied to the detector 108 after the concentration is adjusted by the concentration adjusting device 120.

In the examples of FIGS. 5 and 6, in the same manner as in FIGS. 1 and 2, the concentration adjusting device 120 is provided with a buffer section 121. The buffer section 121 may be one that increased in the capacity by a space having a cross-sectional area greater than that of the bypass flow path 130, or may be one that increased in the capacity by extending the length of the bypass flow path 130.

The capacity of the buffer section 121 is set such that the detection signal from the detector 108 falls within the dynamic range in a case where a sample with the same quantity as the sample supplied to the FFF device 100 is supplied to the bypass flow path 130 at the time of analysis. The larger the capacity of the buffer section 121, the more the sample is diluted by the mobile phase supplied at a constant flow rate, and therefore, the detection signal from the detector 108 becomes likely to fall within the dynamic range.

Note that the concentration adjusting device 120 is not limited to the configuration in which the buffer section 121 is provided and may be configured such that the mobile phase is mixed with the liquid sample supplied to the bypass flow path 130 to dilute the liquid sample as in the configuration described with reference to FIG. 4. That is, the concentration adjusting device 120 may be any configuration as long as a configuration in which the sample is diluted such that the detection signal from the detector 108 falls within the dynamic range in a case where a sample with the same quantity as the sample supplied to the FFF device 100 is supplied to the bypass flow path 130 at the time of analysis.

7. Modifications

In the above-described embodiments, configurations have been described in which the concentration of the liquid sample flowing out of the FFF device 1100 is detected by a single detector 6, 108. But the present invention is not limited to such a configuration and may be a configuration provided with another detector for detecting other physical properties, such as, e.g., a particle diameter, refractive index, and absorbance of particles in a liquid sample.

Further, the field applied to the liquid sample is not limited to centrifugal force or a cross-flow but may be a field that applies other forces, such as, e.g., an electric field, magnetic force, and heat, to the particles in the liquid sample.

DESCRIPTION OF SYMBOLS

1: Centrifugal field flow fractionator (FFF device)
2: Mobile phase reservoir 3: Liquid feeding pump
4: Rotary valve
5: Sample injection device
6: Detector
7: Waste liquid reservoir
8: Bypass flow path
9; Concentration adjusting device
41: First valve
42: Second valve
90: Buffer section
100: FFF device
101: First mobile phase reservoir
102: Second mobile phase reservoir
103: First liquid feeding pump
104: Second liquid feeding pump
105: Sample injection device
106: First valve
107: Second valve
108: Detector
109: Waste liquid reservoir
120: Concentration adjusting device
121: Buffer section

The invention claimed is:

1. An analysis system comprising:
a mobile phase supply section configured to supply a mobile phase;
a sample injection device configured to inject a sample into the mobile phase supplied from the mobile phase supply section to produce a liquid sample;
a field flow fractionator configured to classify particles in the liquid sample by applying a field to the liquid sample supplied from the sample injection device;
a detector configured to detect the particles in the liquid sample classified by the field flow fractionator;
a bypass flow path configured to directly fluidically connect the sample injection device and the detector; and
a flow path switching unit configured to switch a flow path to guide the liquid sample from the sample injection device to the field flow fractionator or the bypass flow path,
wherein the sample injection device is provided upstream of the flow path switching unit,
wherein the bypass flow path is provided with a concentration adjusting device for adjusting a concentration of the liquid sample supplied from the sample injection device,
wherein a quantity of the sample included in the liquid sample supplied to the field flow fractionator is the same as a quantity of the sample included in the liquid sample supplied to the bypass flow path, and
wherein, prior to supplying the liquid sample to the detector by the bypass flow path, the concentration adjusting device dilutes the quantity of the sample included in the liquid sample supplied to the bypass flow path such that a first detection signal from the detector falls within a dynamic range of the detector.

2. The analysis system as recited in claim 1,
wherein the concentration adjusting device dilutes the liquid sample supplied to the detector from the bypass flow path by increasing a quantity of mobile phase included within the liquid sample supplied to the detector from the bypass flow path.

3. The analysis system as recited in claim 1, further comprising:
an operation unit configured to calculate a recovery rate of the particles in the liquid sample based on: a second detection signal from the detector in a case where the liquid sample is supplied to the detector from the field flow fractionator and a field is applied; and the first detection signal from the detector in a case where the liquid sample is supplied to the detector from the bypass flow path.

4. The analysis system as recited in claim 3,
wherein the concentration adjusting device includes a buffer section having a capacity that allows the liquid sample supplied to the detector from the bypass flow path to be diluted such that the first detection signal from the detector falls within the dynamic range of the detector.

5. The analysis system as recited in claim 4,
wherein the capacity of the buffer section is equal to or substantially equal to a capacity of a flow path included in the field flow fractionator.

6. The analysis system as recited in claim 4,
wherein the capacity of the buffer section allows the liquid sample supplied to the detector from the bypass flow path to be diluted such that a peak intensity of the first detection signal from the detector is equal to or substantially equal to the second detection signal from the detector.

* * * * *